H. T. ADAMS.
MOTOR CYCLE ATTACHMENT.
APPLICATION FILED DEC. 5, 1908.
936,845.
Patented Oct. 12, 1909.
2 SHEETS—SHEET 1.
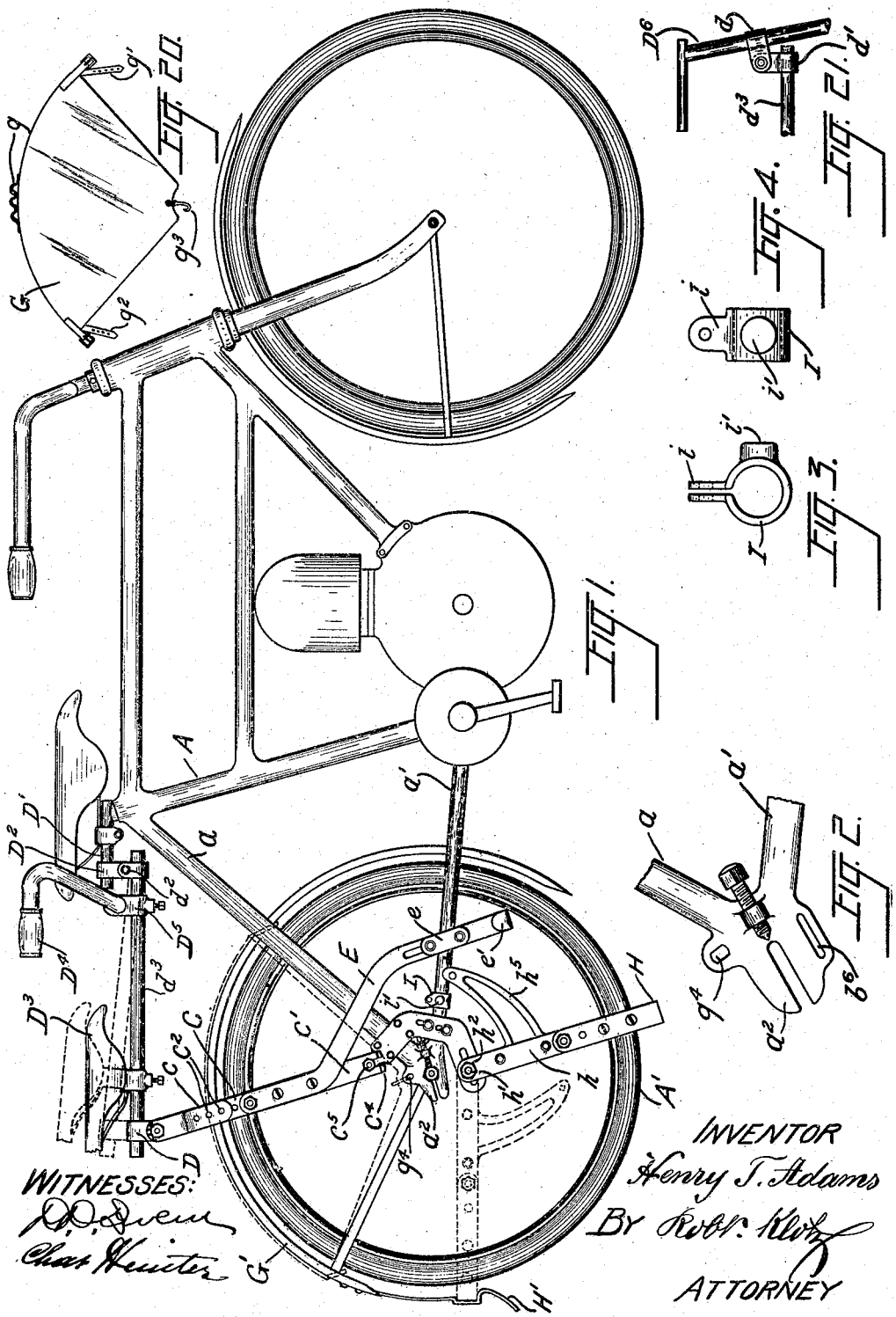
WITNESSES:
INVENTOR
Henry T. Adams
By Robt. Klotz
ATTORNEY

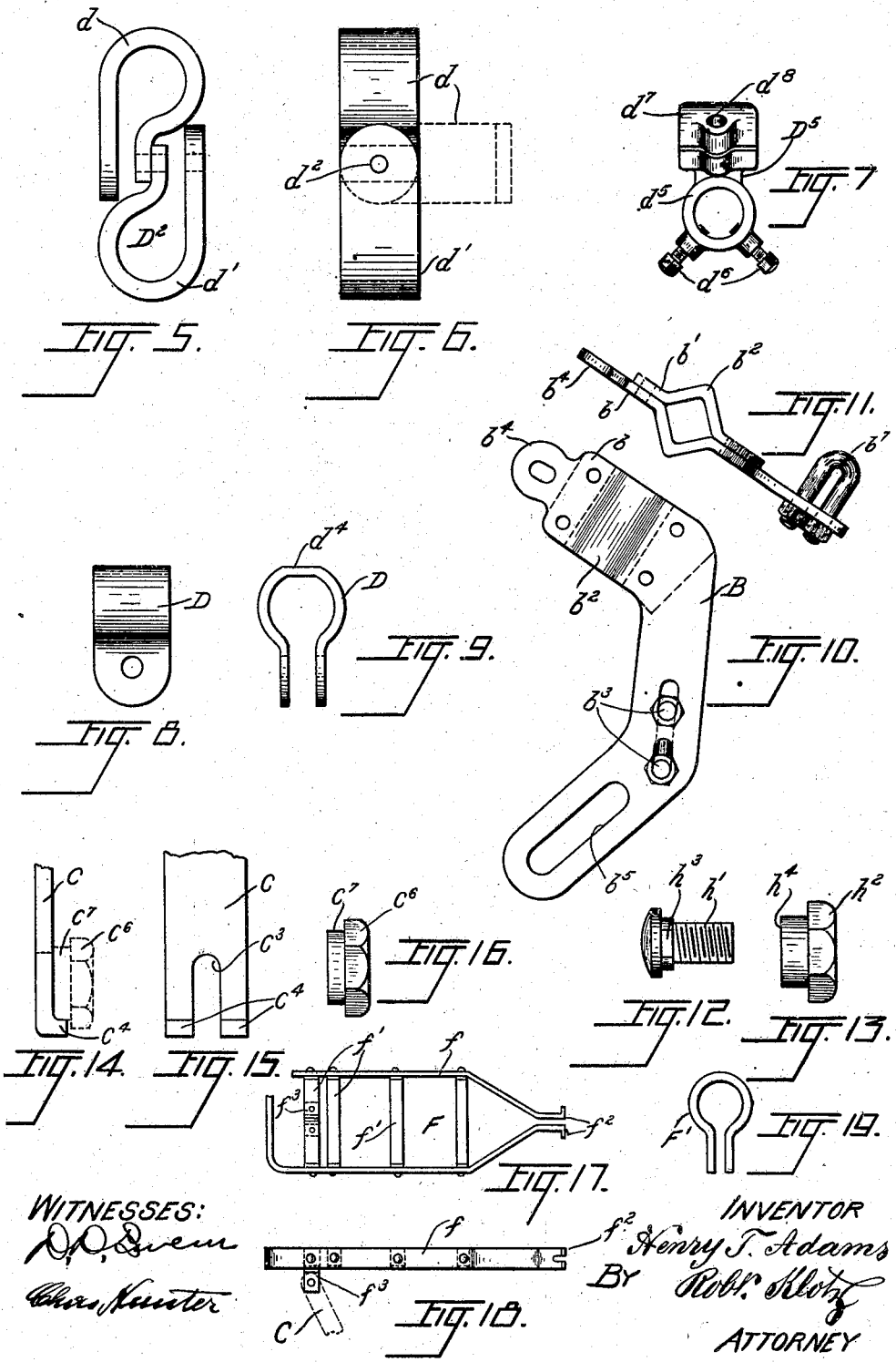

UNITED STATES PATENT OFFICE.

HENRY T. ADAMS, OF CHICAGO, ILLINOIS.

MOTOR-CYCLE ATTACHMENT.

936,845. Specification of Letters Patent. Patented Oct. 12, 1909.

Application filed December 5, 1908. Serial No. 466,062.

*To all whom it may concern:*

Be it known that I, HENRY T. ADAMS, a citizen of the United States, and residing at Chicago, in the county of Cook and State of Illinois, have invented a new and useful Improvement in Motor-Cycle Attachments, of which the following is a complete specification.

This invention relates to improvements in motor-cycle attachments and more particularly to a tandem attachment for passengers or luggage.

The object of the invention is to provide an adjustable tandem attachment for motor-cycles, so constructed that it may be attached to any desired make of motorcycle frame.

It is a further object of the invention to provide an attachment for motorcycles which is adapted to be adjusted to meet the requirements of cycles of various heights, and which also is adapted to be quickly attached to or removed from the motorcycle frame.

A still further object of the invention is to provide means for adjustably attaching a cycle stand so that it will not be in the way when it is desired to adjust or remove the rear wheel, and which is adapted to be adjusted with respect to the adjustments of the rear cycle wheel.

Another object of the invention is to provide a tandem attachment adapted to be secured to either a vertical or a horizontal seat pillar, according to the construction of the particular make of the cycle frame.

The invention consists of the matters hereinafter described in the specification and more fully pointed out and defined in the appended claims.

In the drawings: Figure 1 is a side elevation of a motor-cycle provided with attachments embodying my invention. Fig. 2 is a fragmentary, side elevation of a modified form of the rear wheel fork of the cycle frame. Fig. 3 is an end elevation of the auxiliary attaching means for the cycle stand. Fig. 4 is a side elevation of the same. Fig. 5 is an end elevation of the hinged clamp forming the connection between the tandem attachment and the seat pillar. Fig. 6 is a side elevation of the same. Fig. 7 is an end elevation of the handle bar clamp. Fig. 8 is a side elevation of the clamp for the upper end of the adjustable upright. Fig. 9 is an end elevation of the same. Fig. 10 is a side elevation of the attaching bracket. Fig. 11 is a top plan view of the same. Figs. 12 and 13 are side elevations of the clamping bolt and nut for the cycle stand. Fig. 14 is a fragmentary, rear elevation of one end of the adjustable upright. Fig. 15 is a fragmentary, side elevation of the same. Fig. 16 is a side elevation of the clamping nut therefor. Fig. 17 is a fragmentary plan view of the luggage carrier. Fig. 18 is a side elevation of the same. Fig. 19 is an end elevation of the attaching clamp therefor. Fig. 20 is a side elevation of the dress guard. Fig. 21 is a fragmentary, side elevation showing the means for attaching the tandem attachment to a vertical seat pillar.

As shown in said drawings, A indicates a cycle frame having braces $a$ and $a'$ extending rearwardly and provided with a fork $a^2$ in which is mounted the rear wheel A' by any preferred means affording adjustment with respect to the drive chain, as is usual in such devices.

Clamped upon the rear ends of the frame braces $a$ and $a'$ is the attaching bracket B which, as shown more clearly in Figs. 10 and 11, comprises a plate of metal having its ends turned rearwardly, and the upper end $b$ thereof having an offset portion, which together with a similar offset portion in a plate $b'$ adapted to be attached thereto, forms a sleeve $b^2$ adapted to receive said brace $a$. Below said sleeve the bracket is provided with slots $b^3$ adapted to receive a U bolt $b^7$ to attach it to the brace $a'$. Said slots provide means for attaching the bracket to various makes of frames, where the distance between the braces $a$—$a'$ varies. On the upper end of said bracket is a slotted lug $b^4$ to which the lower end of the adjustable upright C is adjustably attached. Said upright, as shown more clearly in Fig. 1, comprises an upper and a lower section indicated respectively by $c$—$c'$, having overlapping ends in which are provided bolt apertures $c^2$ for the reception of attaching bolts and permitting the upright to be adjusted as to length. The outer end of each section is slotted, as shown at $c^3$ in Fig. 15, and is turned outwardly to provide a ledge $c^4$. The lower end of the section $c'$ is adapted to overlap the outer side of the lug $b^4$, and the bolt $c^5$, shown in Fig. 1, is inserted through the slots in said lug and said end, and the nut $c^6$ secured on the bolt. Said nut, as shown more clearly in Fig. 16, is provided with a cylindrical boss $c^7$ on its inner face behind which the ledge $c^4$ engages and prevents the upright from becoming disengaged from the bracket should the nut become loosened. When, however, it is desired to remove the upright it is only necessary to retract the nut sufficiently to permit the ledge $c^4$ to pass the boss $c^7$. There are of course one of the attaching brackets and one of the uprights on each side of the wheel, and the upper ends of the uprights are bent inwardly and bolted to a clamp D by the same kind of a joint as that afforded at the lower end of the upright.

The frame is provided, as shown in Fig. 1, with a horizontal seat pillar D', and to said seat pillar is attached a jointed clamp $D^2$, which, as shown more clearly in Fig. 5, is S shaped and comprises two practically U shaped members $d$—$d'$ adapted to be pivoted together by a bolt $d^2$. One member of said clamp is adapted to receive the seat pillar and the other member thereof is adapted to receive the forward end of the seat bar $d^3$, the rear end of which is engaged in the clamp D, which as shown is flattened at its top at $d^4$, and the bar is likewise flattened to prevent its turning. By means of the jointed clamp $D^2$ it is possible to adjust the upright C to vary the height of the rear seat $D^3$ which is secured to the seat bar $d^3$. Handle bars $D^4$ are adjustably secured to said bar by means of the adjustable handle bar clamp $D^5$, which, as shown more clearly in Fig. 7, comprises a sleeve $d^5$ slidably engaged on said bar and adapted to be held in place by set screws $d^6$. On the top of said sleeve is a jaw clamp $d^7$ adapted to receive the handle bars and which is provided with a bolt seat $d^8$ adapted to receive a bolt for tightening the jaw clamp on the handle bars. Should the cycle be provided with a vertical seat pillar $D^6$, as shown in Fig. 21, the joint clamp is bent at an angle to receive the pillar and the bar, and when it is tightened by means of its bolt $d^2$ it will rigidly engage said parts.

Rigidly secured to the upright C and extending downwardly and forwardly therefrom is the foot-rest bar E which is secured to the frame brace $a'$ by means of an adjustable clamping plate $e$, adapting the bar to be attached to said brace at varying angles, dependent upon the construction of frame and position of the upright. The lower end of said bar E is turned outwardly to provide a foot rest $e'$.

If desired the seat bar $d^3$ may be removed and a luggage carrier F attached in its place. Said carrier as shown more clearly in Figs. 17 and 18, comprises a frame $f$ having cross bars $f'$ thereon on which the packages are laid. The forward ends $f^2$ of said frame $f$ are brought together and formed similarly to the upright C, and are bolted to a clamp F' adapted to be engaged to the seat pillar. To the rear cross bar $f'$ is attached a clip $f^3$ adapted to be bolted to the upper end of the adjustable upright C.

G indicates a dress guard of any preferred construction, which is curved on its top to conform to the curvature of the rear wheel, and hangs down over the sides of the wheel to prevent the skirts from becoming entangled therein. Said guard is provided on its top with a plurality of loops $g$ adapted to receive a strap for fastening the device to the upright C above the wheel. A plurality of said loops are provided so that the device may be attached to frames of various makes in which the angles vary. At the forward end of said guard is a strap $g'$ adapted to fasten the device to the brace $a$, and a strap $g^2$ at the rear of the guard provides means for securing it to the mud guard G'. The hooks $g^3$ at the bottom of the guard are adapted to be engaged in the apertures $q^4$ in the fork $a^2$.

The lower ends of the attaching brackets B are each provided with an elongated slot $b^5$ in which the cycle stand H is adjustably mounted. Said stand comprises a U shaped member, the sides $h$ of which are comprised of two sections and adapted to be adjusted longitudinally. The upper end of each side member is secured to the bracket B by means of a bolt and nut $h'$—$h^2$, shown in Figs. 12 and 13, the former of which is provided with a flattened shank $h^3$ adapted to seat in the slot $b^5$ and prevent the bolt from turning, and the nut is provided on its inner face with a cylindrical boss $h^4$ on which said side member is journaled. On the front side of each side member $h$ is an upwardly and forwardly directed arm $h^5$ adapted to engage beneath the brace $a'$ when the stand is in operative position. When it is not desired to use the stand it may be turned rearwardly, as shown in dotted lines in Fig. 1, and secured to the spring catch H' carried on the mud guard. By means of the attachment of said stand in the slot $b^5$, the stand may be adjusted forwardly or rearwardly to accommodate various sizes of wheels and to compensate for the adjustment of the wheel forwardly or rearwardly in its yoke.

If preferred the fork $a^2$ of the cycle frame may be provided with a slot $b^6$ corresponding to the slot $b^5$ in the attaching bracket. In that event the stand would be connected in said slot $b^6$ and the bracket B would be dispensed with, and the lower end of the upright C would be connected in the aperture $q^4$. If preferred also, an auxiliary attaching member for the cycle stand may be provided, comprising a clamping collar I, shown in Figs. 3 and 4, and which may be adjustably secured to the brace $a'$ on each side of the machine by means of a bolt passing through apertured ears $i$ thereon. On the outer side of each collar is a boss $i'$ adapted to support the cycle stand when it is desired to remove the tandem attachments and the rear wheel.

The operation is as follows: The adjustable bracket B is secured in position on the frame, and the uprights attached thereto. If the tandem attachment is to be used for carrying a passenger, the seat bar is attached at its rear end to the upper end of the upright and at its forward end is attached to the seat pillar by means of the jointed clamp $D^2$. Owing to the jointed construction of said clamp $D^2$, the upright C may be adjusted longitudinally to suit the convenience of the passenger. The foot-rest is clamped to the brace $a'$ by means of the plate $e$, which permits of the upright being swung forwardly or rearwardly on the bolt $c^3$, and also permits the attachment to be applied to varying designs of cycle frames. When desired the luggage carrier may be attached in place of the seat bar and the articles to be carried thereon may be strapped or otherwise secured in place.

The cycle stand is adjustably secured in the slot $b^5$ in the bracket B which permits the stand to be adjusted forwardly or rearwardly as occasion requires. This construction permits of the rear wheel being removed or adjusted without interference from the stand. If it becomes necessary to remove the bracket the stand may be quickly attached to the bosses $i'$, and where a specially designed frame is to be used with the tandem attachment the bracket B is dispensed with and the stand secured in the slot $b^6$ in the frame.

Obviously the attaching bracket B affords means for securing the tandem attachment to any make of cycle frame and affords a very convenient means for attaching and carrying the cycle stand where it will not interfere with the adjustments of the rear wheel. Obviously also many details of form and construction may be varied without departing from the principles of my invention.

I claim as my invention:

1. The combination with a cycle frame, of an attaching bracket on the rear end thereof, an upright having a slotted lower end adapted to overlap the upper end of said bracket, a bolt engaging said upright to said bracket, a seat pedestal, a jointed clamp thereon, and means connecting said clamp with the upper end of said upright.

2. The combination with a cycle frame, of an attaching bracket thereon, adjustable means adapted to secure said bracket to said frame, an upright having a slotted, outturned lower end adapted to be secured to said bracket, a bolt engaged through the upper end of the bracket and through said slot above the outturned end of the upright, a seat pedestal, and means connecting the upper end of said upright with said pedestal.

3. The combination with a cycle frame of an attaching bracket thereon, an upright adjustably connected at its lower end to said bracket, said upright having a slotted lower end and a ledge beneath said slot, a bolt adapted to engage through said slot and the end of the bracket, a nut on said bolt and having a boss on its inner face adapted to engage over said ledge, a seat pedestal, and means connecting the seat pedestal with the upper end of said upright.

4. The combination with a cycle frame of a seat pillar thereon, a centrally jointed clamp secured to said pillar, an attaching bracket mounted on the rear end of the frame and provided with an apertured ear at its upper end, a longitudinally adjustable upright having its lower end slotted and turned outwardly, a bolt passing through said slot and apertured ear, a nut on said bolt and having a boss on its inner face adapted to project above the outturned end of said upright and means connecting the upper end of said upright with said clamp.

5. The combination with a cycle frame, of an attaching bracket thereon, an upright mounted on the upper end of said bracket and adapted to be adjusted on said upright as a center, a brace extending from said upright to said frame, a seat pillar, and means connecting said pillar with said upright.

6. The combination with a cycle frame having a rear axle, of an attaching bracket clamped thereon adjacent the rear axle, a longitudinally adjustable upright having a slotted lower end, an outwardly directed ledge on said lower end, a bolt extending through said bracket and said slotted end, a nut thereon having a shoulder adapted to rest on said ledge, a seat pillar, a centrally jointed clamp thereon, and a bar connecting said upright with said clamp.

In testimony whereof I have hereunto subscribed my name in the presence of two witnesses.

HENRY T. ADAMS.

Witnesses:
GEORGE H. MEISER,
ROBT. KLOTZ.